US009569977B2

(12) United States Patent
Binyamin

(10) Patent No.: US 9,569,977 B2
(45) Date of Patent: Feb. 14, 2017

(54) RESPONSIVE BOOK SYSTEM AND METHOD THEREFOR

(75) Inventor: Moshe Binyamin, Jerusalem (IL)

(73) Assignee: E.V.T.T. LTD, Jerusalem (IL)

( * ) Notice: Subject to any disclaimer, the term of this patent is extended or adjusted under 35 U.S.C. 154(b) by 525 days.

(21) Appl. No.: 12/990,784

(22) PCT Filed: Feb. 24, 2009

(86) PCT No.: PCT/IL2009/000205
§ 371 (c)(1),
(2), (4) Date: Nov. 3, 2010

(87) PCT Pub. No.: WO2009/136390
PCT Pub. Date: Nov. 12, 2009

(65) Prior Publication Data
US 2011/0111382 A1     May 12, 2011

Related U.S. Application Data

(60) Provisional application No. 61/051,021, filed on May 7, 2008.

(51) Int. Cl.
*G09B 5/00* (2006.01)
*G09B 5/06* (2006.01)

(52) U.S. Cl.
CPC ..................... *G09B 5/062* (2013.01)

(58) Field of Classification Search
CPC ........................................ G09B 5/00
USPC ....................................... 434/317
See application file for complete search history.

(56) References Cited

U.S. PATENT DOCUMENTS

| 4,985,697 | A |   | 1/1991  | Boulton |
|-----------|---|---|---------|---------|
| 5,466,158 | A |   | 11/1995 | Smith |
| 5,520,544 | A | * | 5/1996  | Manico et al. ............... 434/317 |
| 5,645,432 | A | * | 7/1997  | Jessop ............................. 434/322 |
| 5,739,814 | A | * | 4/1998  | Ohara et al. .................... 345/173 |
| 5,795,213 | A | * | 8/1998  | Goodwin ....................... 446/297 |
| 5,820,379 | A | * | 10/1998 | Hall et al. ..................... 434/178 |
| 5,897,324 | A |   | 4/1999  | Tan |
| 5,909,207 | A | * | 6/1999  | Ho ................................. 345/156 |
| 5,911,582 | A | * | 6/1999  | Redford et al. ........... 434/307 R |
| 6,064,855 | A | * | 5/2000  | Ho ......................... G09B 5/062  345/901 |

(Continued)

FOREIGN PATENT DOCUMENTS

JP     H08-160844 A     6/1996
JP     H10-016438 A     1/1998

(Continued)

*Primary Examiner* — Sam Yao
*Assistant Examiner* — Alvin Carlos
(74) *Attorney, Agent, or Firm* — Mark M. Friedman

(57) ABSTRACT

In one aspect, the present invention is directed to a responsive book system comprising: a book comprising a detecting system, for detecting a current page from a plurality of detectable pages of the book (i.e., the opened page); a storage, for storing content associated with each of the detectable pages; and one or more remote responders, for playing and/or displaying the content associated with the current page. In another aspect, the present invention is directed to a responsive book method comprising the steps of: detecting the current page in a book from a plurality of pages; and playing and/or displaying, by a remote responder, content associated with the current page.

24 Claims, 7 Drawing Sheets

(56) References Cited

U.S. PATENT DOCUMENTS

| | | | |
|---|---|---|---|
| 6,089,943 A * | 7/2000 | Lo | 446/175 |
| 6,167,233 A * | 12/2000 | Gresser et al. | 434/308 |
| 6,201,947 B1 * | 3/2001 | Hur et al. | 434/317 |
| 6,330,427 B1 * | 12/2001 | Tabachnik | 434/317 |
| 6,697,602 B1 * | 2/2004 | Ferrigno et al. | 434/308 |
| 6,865,367 B2 * | 3/2005 | Kim | B42D 3/123 345/901 |
| 6,866,196 B1 * | 3/2005 | Rathus et al. | 235/462.15 |
| 7,035,583 B2 * | 4/2006 | Ferrigno et al. | 434/308 |
| 7,081,885 B2 * | 7/2006 | Blume | 345/173 |
| 7,224,934 B2 * | 5/2007 | Mullen | B42D 1/007 345/901 |
| 7,299,971 B2 * | 11/2007 | Marggraff et al. | 235/375 |
| 7,703,683 B2 | 4/2010 | Rathus | |
| 2003/0113696 A1 * | 6/2003 | Kirwan | 434/317 |
| 2003/0116620 A1 * | 6/2003 | Song | G06F 3/0224 235/375 |
| 2004/0016809 A1 * | 1/2004 | Song | 235/449 |
| 2005/0272019 A1 * | 12/2005 | Crystal et al. | 434/236 |
| 2007/0134638 A1 | 6/2007 | Mullen | |

FOREIGN PATENT DOCUMENTS

| | | |
|---|---|---|
| JP | H10-328421 A | 12/1998 |
| JP | 2002-519726 A | 7/2002 |

\* cited by examiner

RESPONSIVE BOOK SYSTEM AND METHOD THEREFOR

FIELD OF THE INVENTION

The present invention relates to the field of storybooks. More particularly, the present invention relates to the field of responsive book systems.

BACKGROUND OF THE INVENTION

A book is used for obtaining information from a visual source. A tape or a screen is used for obtaining information from a vocal or multimedia source.

Although multimedia sources are advantaged for their multimedia representations, books are still preferred due to their physical presentation.

Prior art techniques include attachment of cassettes, DVDs or software to a book.

U.S. Pat. No. 5,897,324, and U.S. Pat. No. 5,466,158 are considered by the applicant as the closest prior art.

It is an object of the present invention to provide a responsive book system, which overcomes the obstacles and drawbacks of the prior art.

Other objects and advantages of the invention will become apparent as the description proceeds.

SUMMARY OF THE INVENTION

In one aspect, the present invention is directed to a responsive book system comprising:
a book comprising a detecting system, for detecting a current page from a plurality of detectable pages of the book (i.e., for detecting the opened page);
a storage, for storing content associated with each of the detectable pages; and
one or more remote responders, for playing and/or displaying the content associated with the current page.

Each of the remote responders may be is embedded in a doll, a display, or another object.

According to one embodiment of the invention, the book further comprises a transmitter, for transmitting to the remote responders a signal indicating the current page; and each of the remote responders comprises a receiver, for receiving the signal.

According to one embodiment of the invention, the transmitted signal indicates the current page, thereby allowing each of the responders to display the content associated with the current page.

According to another embodiment of the invention, the signal itself comprises the content.

The transmitter may comprise a stereo-transmitter using a single standard stereo channel, and each sub-channel thereof transmitting a different response to each of the remote responders.

The responsive book system may further comprise a recorder, for recording new content to be associated with the detectable pages.

According to one embodiment of the invention, the detecting system comprises:
distinctive zones on the cross-sectional area of the book, each distinctive zone associated with one of the plurality of pages;
a detectable mark on each of the plurality of pages, each of the detectable marks located in the distinctive zone thereof, for providing the association; and
detectors for detecting the detectable marks.

According to a preferred embodiment of the invention, the detectable mark is invisible.

In embodiments of the present invention, the detectable mark comprises a first magnet.

Each of the detectors may comprise a resonance circuit in the distinctive zone in the binding of the book, for detecting the first magnet, for detecting the current page.

The detecting system may further comprise at least a second magnet located in the distinctive zone on at least one page between the first magnet and the resonance circuit, the second magnet for increasing the detectability of the first magnet.

Each of the detectable marks may comprise an electrical contact, for closing and opening an electrical circuit between the electrical contacts of adjacent pages, upon leafing of each of the current pages.

In another aspect, the present invention is directed to a method for making a book respond, said method comprising the steps of:
detecting the current page in a book from a plurality of pages; and
playing and/or displaying, by a remote responder, content associated with the current page.

The method may further comprise the steps of:
transmitting a signal from the book for indicating the current page; and
receiving the signal from the book, for providing the response.

According to one embodiment of the invention, the transmitting is carried out by a stereo transmission, each stereo channel thereof transmitting content or indication of content associated with a different remote responder.

The method may further comprise the step of recording the content.

According to one embodiment of the invention, the detecting step comprises influencing a resonance circuit by a magnet located on a page.

In embodiments of the present invention, the detecting step comprises closing or opening an electric circuit upon leafing using electric contacts on the pages.

The responding may comprise recording, reading, moving.

The forgoing embodiments of the invention have been described and illustrated in conjunction with systems and methods thereof, which are meant to be merely illustrative, and not limiting.

BRIEF DESCRIPTION OF THE DRAWINGS

Embodiments and features of the present invention are described herein in conjunction with the following drawings.

It should be understood that the drawings are not necessarily drawn to scale.

DETAILED DESCRIPTION OF PREFERRED EMBODIMENTS

The present invention will be understood from the following detailed description of preferred embodiments, which are meant to be descriptive and not limiting. For the sake of brevity, some well-known methods, systems, procedures, components, circuits, and so on, have not been described in detail.

Figure 1:
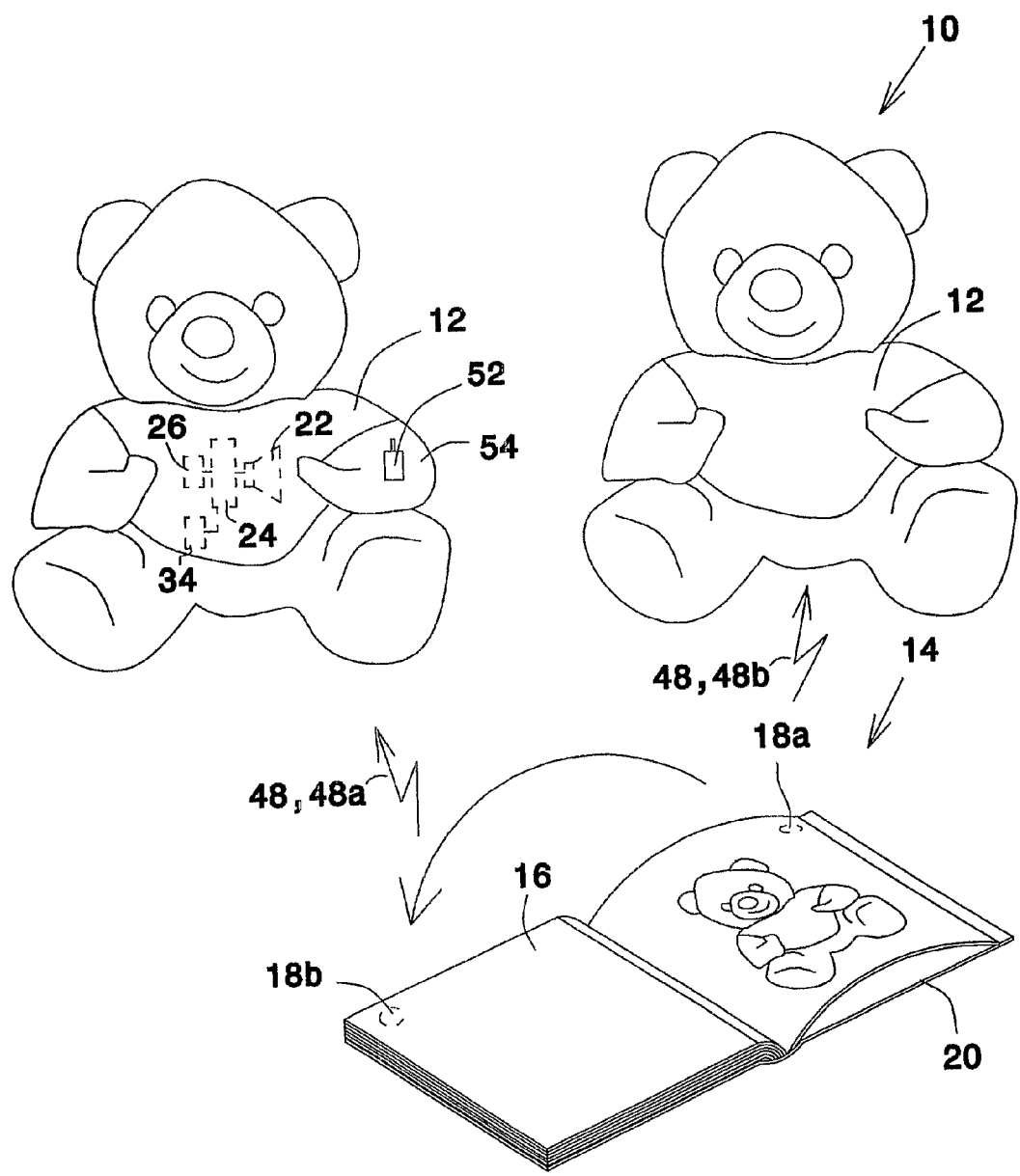
FIG. 1 is a view of the responsive book system, according to one embodiment of the present invention.

FIG. 1 is a view of the responsive book system, according to one embodiment of the present invention.

According to this embodiment of the invention, the responsive book system 10 includes a book 14 and a doll 12 or another remote responder responding to a signal 48. The signal provides information about current page 16 of book 14, which may be produced upon turning to or from or during that page.

Doll 12 includes a receiver 26 for receiving signals from book 14, a processing unit 24 for selecting a presentation associated with the current page; an input/output unit 22, such as a loudspeaker, and so on.

Receiver 26 receives signal 48 from book 14. The signal may be a wireless signal, transmitted using a wireless transmitter 38 in book 14, or may be wired signal.

Signal 48 may inform processing unit 24 of the current selected book, and the processing unit selects the response, which is appropriate to the current page 16 by retrieving the appropriate file from storage 34.

According to another embodiment book 14 may include storage 34, such that signal 48 transmitted by book 14 may already include the file. This topology provides that book 14 includes all of the information, and may thus may be replaced by another book 14 performing similar functions.

Input/output unit 22 may be a motor 52, such that the response of doll 12 may be motional, such as a raised hand 54.

A typical application of responsive book system 10 is for children listening to their mother tell a bedtime story. Upon turning page 16, doll 12 may say, sing, or dance appropriately to the page read.

Input/output unit 22 of remote responder 12 may be a recorder for vocal or video recording or include other signaling functions which depend on the current page of book 14.

For example, system 10 may include a recording mode and a reading mode. By selecting the recording mode, responsive book system 10 may record the section of the story read by the mother to storage 34 and associate that section with the detected page 16; then by selecting the reading mode, responsive book system 10 may retrieve from storage 34 and read the section of the story associated with detected page 16, to the child.

Responsive book system 10 may include a plurality of dolls 12, each responding typically to the current page 16, each, however, responding in a different manner.

For two dolls 12, transmitter 38 may use a single standard stereo channel, each of sub-channels 48a and 48b thereof for one doll 12.

Figure 2:
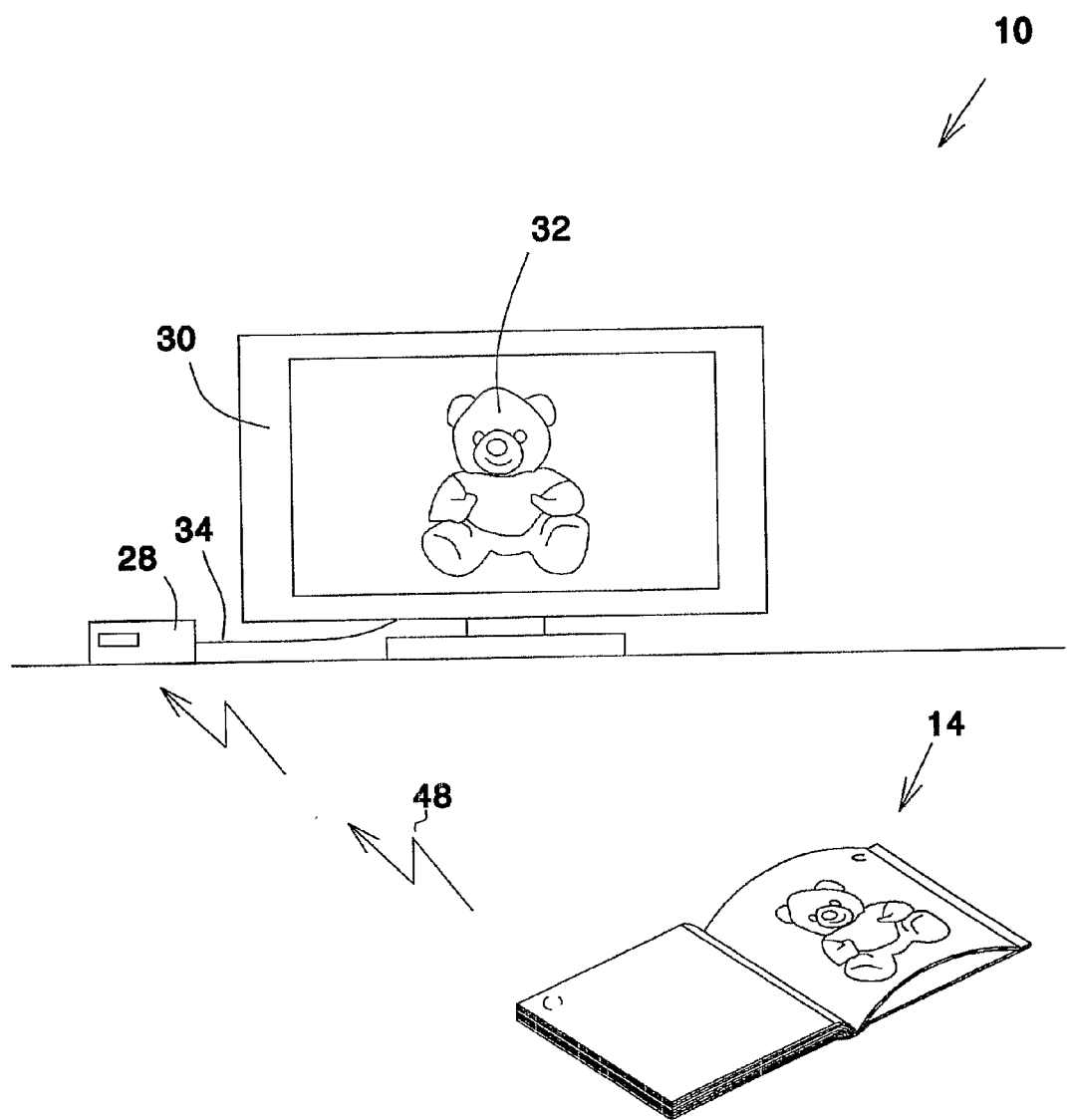
FIG. 2 is a view of the responsive book system, according to another embodiment of the present invention.

FIG. 2 is a view of the responsive book system, according to another embodiment of the present invention.

Doll 12 may be any physical object (e.g. a can) or a display 30 which may include an image 32 of a doll. Multimedia features of display 30 may replace loudspeaker 22 and motor 52.

Figure 3:
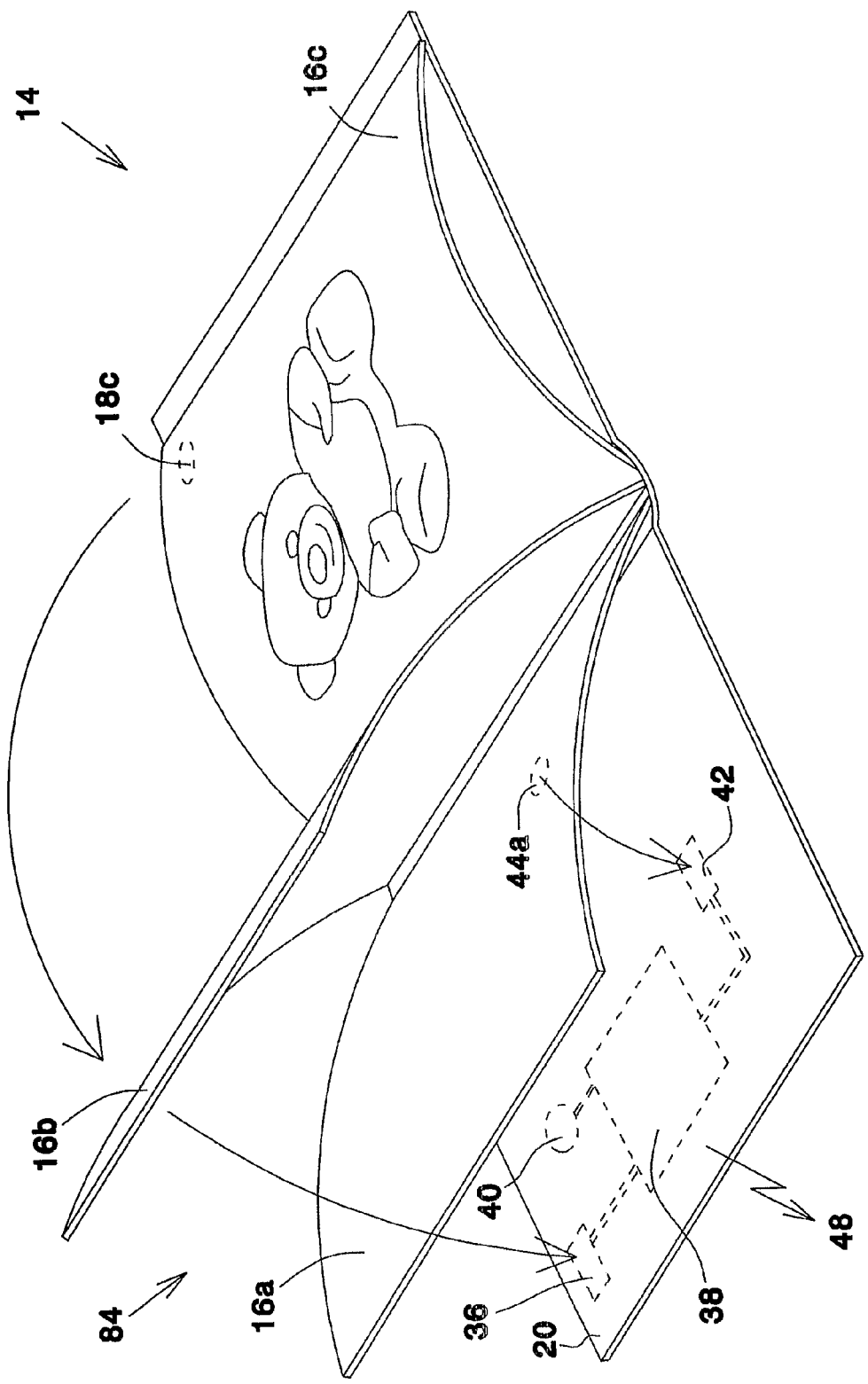
FIG. 3 is an illustration of the components of the book of the responsive book system, according to one embodiment of the present invention.

FIG. 3 is an illustration of the components of the book of the responsive book system, according to one embodiment of the present invention.

Book 14 includes a detecting system 84, for detecting the current page 16, which is based on a distinctive zone on the cross-sectional area of book 14 for each page 16.

The binding 20 of book 14 includes a battery 40 for supplying power, a transmitter 38 for transmitting signals 48 to doll 12, and an array of sensors, such as sensors 36 and 42, each at a different location on binding 20, each location associated to one page.

Each of pages 16 to be detected includes a detectable mark, such as mark 44a for page 16a and mark 18c for page 16c, each mark located above the associated sensor thereof.

According to one embodiment, the detectable mark comprises a magnet. The magnet may be hidden within the page, thus being invisible.

For example, in the cross-sectional area of book 14, the distinctive zone of page 16a is the zone of magnet 44a, and thus binding 20 includes sensor 42 in that zone for detecting page 16a.

The cross-sectional area of page 16a includes a magnet 44a located above sensor 42 thereof, and page 16c includes a magnet 18c located above sensor 36 thereof.

According to this example, sensor 42 senses page 16a by sensing the change of the magnetic field, since magnet 44a on page 16a changes the distance thereof to sensor 42 from a range of millimeters, producing a strong magnetic field upon laying page 16a, to several centimeters upon turning of page 16a.

Magnet 44a and other magnets of book 14 preferably are invisible, being inserted within the paper of each of pages 16.

Figure 4:
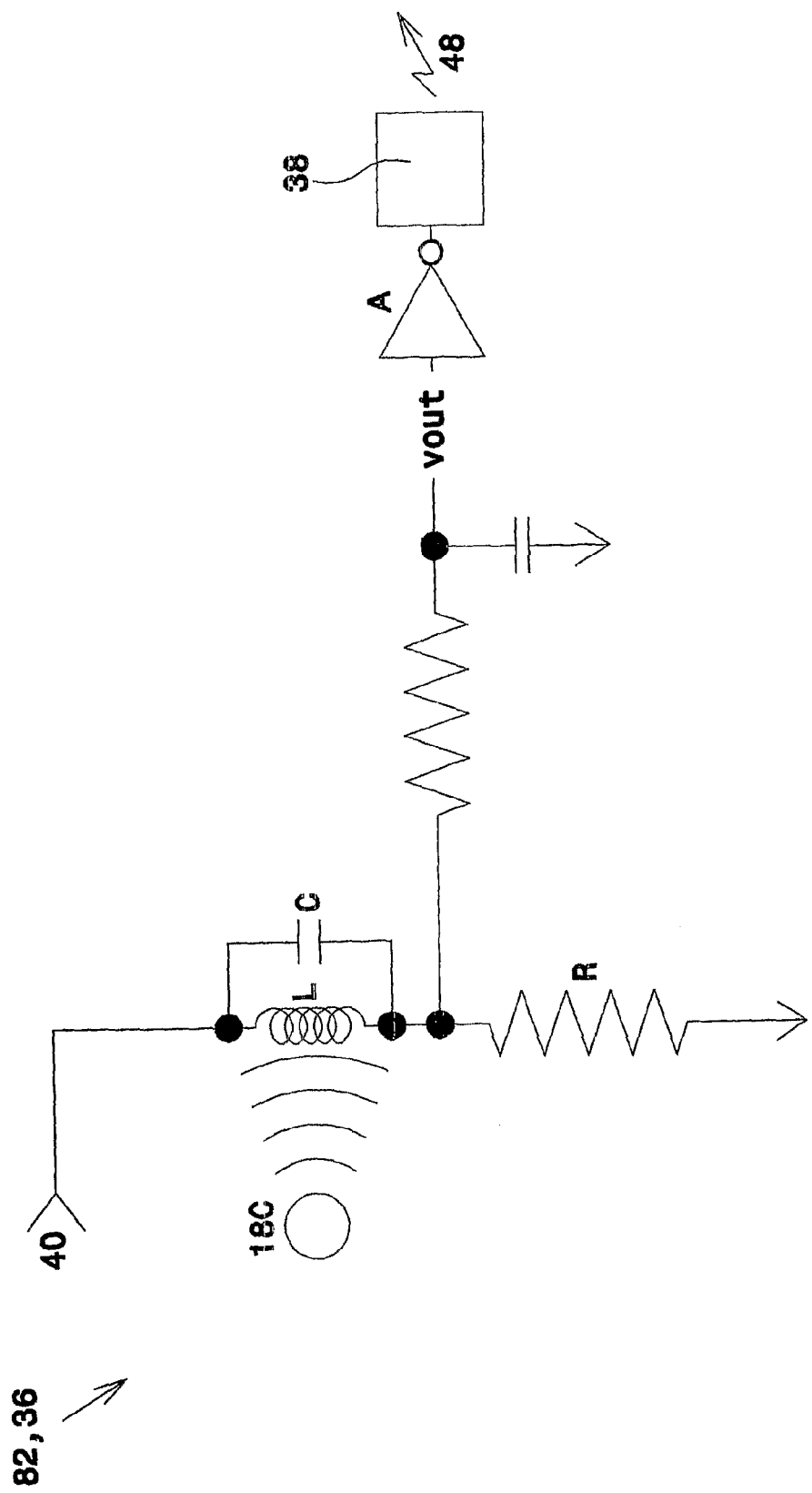
FIG. 4 is an illustration of a circuit of a sensor for sensing the magnetic field of a page of the storybook, according to one embodiment of the present invention.

FIG. 4 is an illustration of a circuit of a sensor for sensing the magnetic field of a page of the storybook, according to one embodiment of the present invention.

Each of sensors 36 and 42 may include a resonance circuit 82, which may be based on a Resistor, Inductor and Capacitor (RLC) circuit forming a harmonic oscillator. Magnet 18c influences the circuit, thus circuit 36 detects magnet 18c, changing the voltage output Vout, which is amplified by amplifier A to be an input to transmitter 38.

Figure 5:
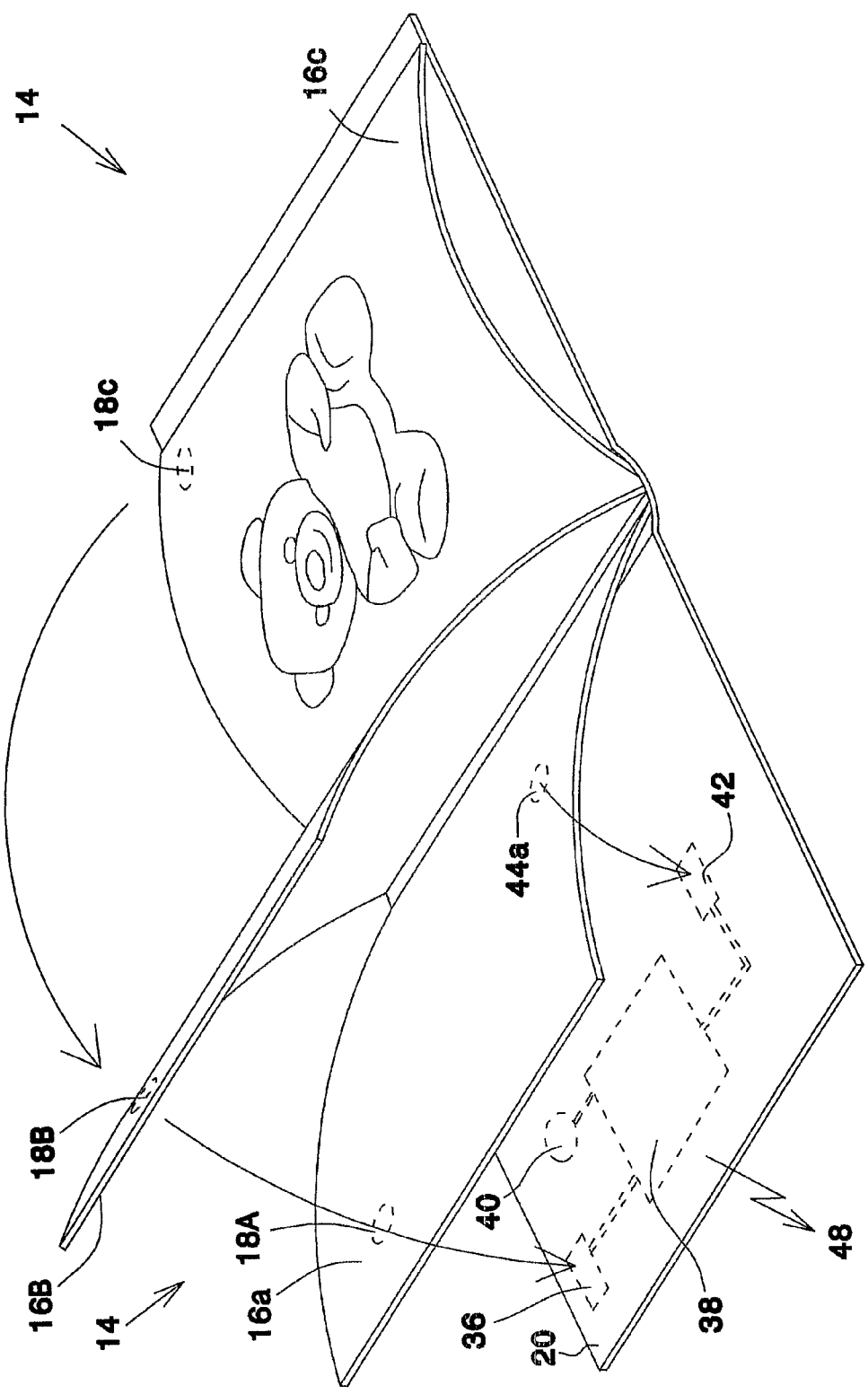
FIG. 5 is an illustration of the components of the book of the responsive book system, according to another embodiment of the present invention.

FIG. 5 is an illustration of the components of the book of the responsive book system, according to another embodiment of the present invention.

FIG. 5 is similar to FIG. 3, except for the addition of magnet 18a in page 16a, and magnet 18b in page 16b, which improve detection of magnet 18c of page 16c.

Magnet 18a in page 16a, magnet 18b in page 16c and magnet 18c accumulate the magnetic field to sensor 36, such that the existence of magnet 18c on page 16c at its prone position on binding 20 is sensible, even for a thick book.

Figure 6:
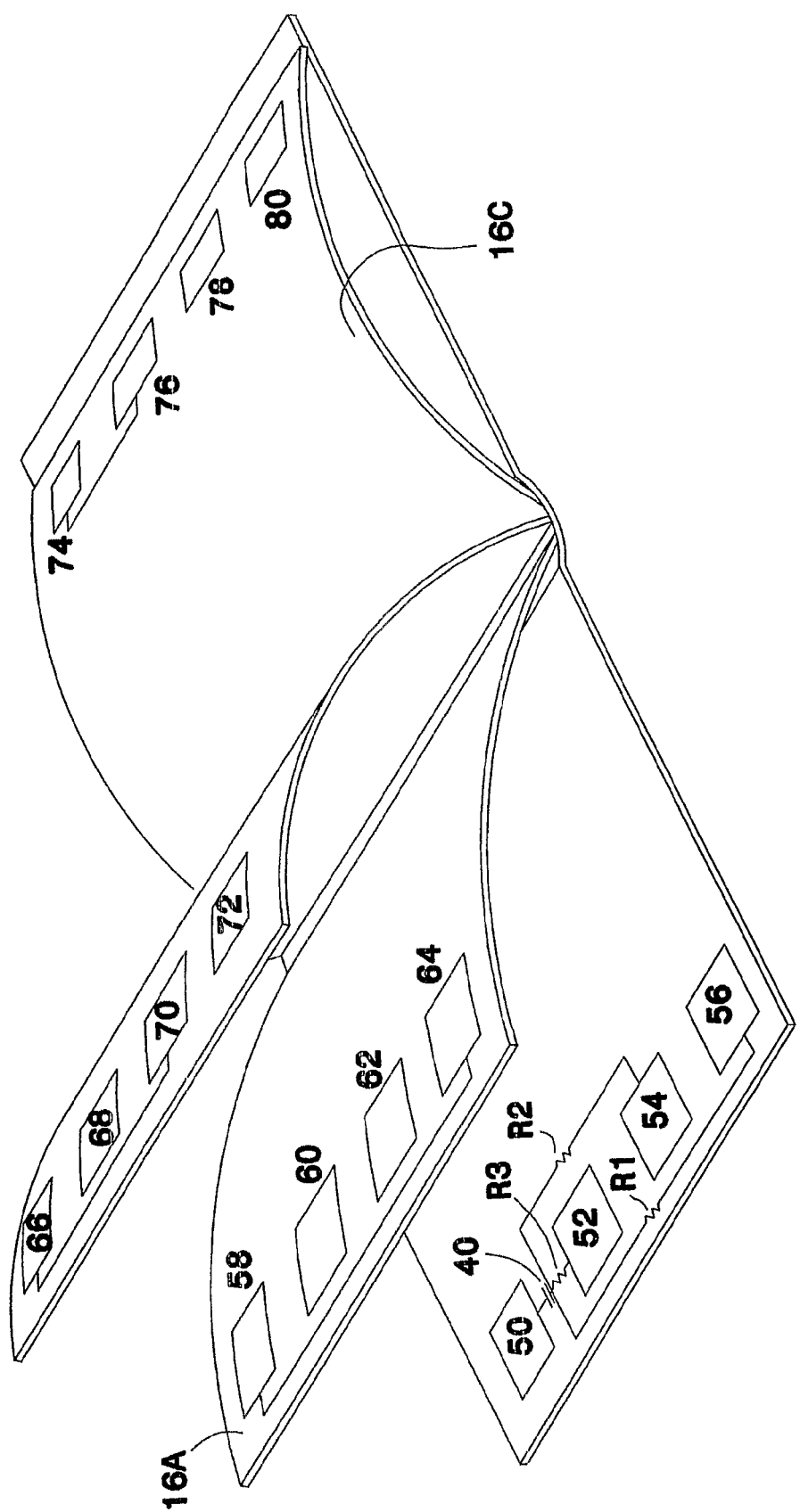
FIG. 6 is an illustration of the components of the book of the responsive book system, according to another embodiment of the present invention.

FIG. 6 is an illustration of the components of the book of the responsive book system, according to another embodiment of the present invention.

According to this embodiment, the detectable marks 44a and 18c comprise electrical contacts.

Each of pages 16a, 16b and 16c and also binding 20 include an array of electrical conductive coated squares, closing—together—electrical circuits, as a function of the current page.

The example of FIG. 6 depicts three electrical circuits, the first having a load R1 for detecting page 16a, the second having a load R2 for detecting page 16b, and a third having a load R3 for detecting page 16c.

Each of loads R1, R2 and R3 represents a sensor for that page, for example, the current through load R3 represents sensor 36 detecting page 16c.

Figure 7:
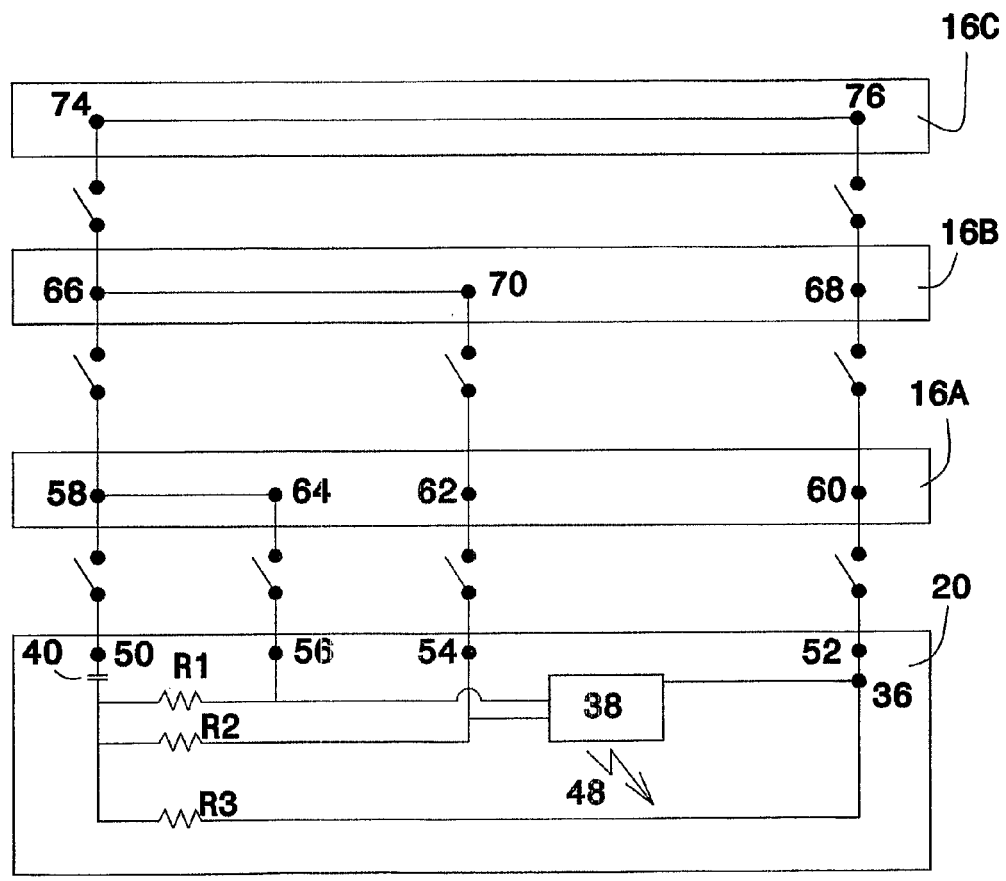
FIG. 7 is an electrical circuit chart including the three circuits of the example of FIG. 6.

FIG. 7 is an electrical circuit chart including the three circuits of the example of FIG. 6.

Page 16a connects square 50 of binding 20 to square 58 of page 16a, and square 64 of page 16a to square 56 of binding 20, thus closing the circuit of load R1.

Page 16a connects square 50 of binding 20 to square 58 of page 16a, and square 62 of page 16a to square 54 of binding 20; page 16b connects square 58 of page 16a to square 66 of page 16b, and square 70 of page 16b to square 62 of page 16a, thus closing the circuit of load R2.

Page 16a connects square 50 of binding 20 to square 58 of page 16a, and square 60 of page 16a to square 52 of binding 20; page 16b connects square 58 of page 16a to square 66 of page 16b, and square 68 of page 16b to square 60 of page 16a; page 16c connects square 66 of page 16b to square 74 of page 16c, and square 76 of page 16c to square 68 of page 16b, thus closing the circuit of load R3.

Transmitter 38 transmits the appropriate signal of page 16c upon current across load R3; or transmits the appropriate signal of page 16c upon current across load R2, subject to no current being across R3; or transmits the appropriate signal of page 16a, upon current across load R1, subject to no current being across R2; and so forth.

Additional conductive squares may be spread on the cross-sectional area formed by conductive printing. The circuits formed by the pages may be organized by a binary or other logic providing enough combinations for each of the pages of book 14.

In the figures and/or description herein, the following reference numerals have been mentioned:

numeral 10 denotes a responsive book system according to one embodiment of the present invention;

numeral 12 denotes a doll, as an example of a remote responder, which responds to leafing of a page of the book;

numeral 14 denotes a book;

numerals 16, 16a, 16b, and 16c denote pages of the book;

numeral 18c denotes a mark on one of the pages for detecting that page, and also a magnet which functions as that mark;

numerals 18a and 18b denote magnets on other pages located in front of 18c, for improving the detection of mark 18c;

numeral 20 denotes the binding of the book;

numeral 22 denotes the input/output unit of the remote responder; it may be a loudspeaker as an output unit;

numeral 24 denotes a processing unit;

numeral 26 denotes a receiver;

numeral 28 denotes a control box for communication between the book and a standard display;

numeral 30 denotes a display, which may be a tool for responding to leafing of the pages;

numeral 32 denotes an image in the display instead of a doll;

numeral 34 denotes a storage, for storing pictures, vocal signals, or mechanical movements of the doll;

numeral 36 denotes a zone distinctive to a certain page, the zone including a detectable mark on the page; according to the magnetic embodiment of sensing numeral 36, it is also a sensor for sensing a page, the sensor described as a resonance circuit;

numeral 38 denotes a transmitter of the book;

numeral 40 denotes a battery of the book;

numeral 42 denotes a zone which is distinctive to another page, the zone including a detectable mark on that page; according to the magnetic embodiment of sensing numeral 42 is also a sensor for sensing that page, the sensor described as a resonance circuit;

numeral 44a denotes a mark for marking a page; according to the magnetic embodiment of sensing numeral 44a is a magnet;

numeral 48 denotes a signal;

numerals 48a and 48b denote sub-channels of a stereo signal;

numerals 50, 52, 54, and 56 denote electrical contacts on the binding of the book;

numerals 58, 60, 62, 64, 66, 68, 70, 72, 74, 76, 78 and 80 denote electrical contacts of the pages of the book, which are, according to the electrical contact embodiment, the marks for detecting the pages;

numeral 82 denotes a resonance circuit; and numeral 84 denotes a detecting system, for detecting the current page.

The foregoing description and illustrations of the embodiments of the invention has been presented for the purposes of illustration. It is not intended to be exhaustive or to limit the invention to the description above in any form.

What is claimed is:

1. A responsive book system comprising:
a book comprising a binding and a plurality of detectable pages and a detecting system for detecting a current page from the plurality of detectable pages of said book, said detecting system including distinctive zones on the cross-sectional area of said book, each distinctive zone uniquely associated with one of said plurality of detectable pages, and including a detectable mark on each of said plurality of pages, each of said detectable marks located in said distinctive zone thereof, for providing said association, each detectable mark including a first magnet;
a storage in the book, for storing content associated with each of said detectable pages, the content of the plurality of detectable pages combining together to form a combined story of the book;
a plurality of remote responders, for playing the content associated with said current page, wherein each of said remote responders comprises a doll having a receiver embedded therein and having a processing unit with access to the storage, the content including audio associated with the current page and movement, if any, of the plurality of dolls accompanying the audio; and
the detecting system in the book also having an array of sensors at locations in one of (i) the binding or (ii) a book cover, uniquely associated with a current page for detecting the detectable marks and for sensing changes in a magnitude of an electromagnetic field as said current page is turned by a user, the magnitude of the electromagnetic field as the current page is turned being proportionate to a distance between (i) a sensor, of the array of sensors, uniquely associated with the current page and (ii) a first magnet located in the distinctive zone uniquely associated with said current page, so as to identify a particular page of the book as the current page, wherein each page of the plurality of detectable pages includes a top and bottom surface configured to present the contents of the book in words and/or pictures, each of the top and bottom surfaces having a surface area, wherein the detectable marks are embedded within the plurality of detectable pages, and wherein the detecting system is embedded within the plurality of detectable pages and at least one of the cover page and binding, such that incorporation of the detecting system into the book does not interrupt the surface area of any page of the plurality of detectable pages and does not extend the surface area of any page of the plurality outward away from the binding;

the book also having at least one transmitter configured to transmit to said plurality of dolls a plurality of signals providing information from the storage including a first signal to the first doll concerning said current page and including a separate and independent second signal to the second doll concerning said current page; and each of said one or more receivers configured to receive said separate first or second respective signal of the plurality of signals, the processing unit of each particular doll of the plurality of dolls for selecting the response of the particular doll to the current page, wherein the responsive book system is configured to allow a user to turn current pages of the book and thereby hear the plurality of dolls play contents of the current pages by using a single source of content from the storage to simultaneously provide a plurality of separate and independent signals of the plurality of signals respectively to the plurality of dolls wherein a content played by the first doll is not determined from a content played by the second doll or from an identity of the second doll.

2. A responsive book system according to claim 1, wherein the detecting system and detectable marks are invisibly embedded within the material of the plurality of detectable pages and at least one of the cover page and binding, such that incorporation of the detecting system and the detectable marks into the book does not interrupt the surface area of any page of the plurality of detectable pages and does not extend the surface area of any page of the plurality outward away from the binding.

3. A responsive book system according to claim 1, wherein each doll in the plurality of dolls is configured to respond to said current page in a different manner such that one doll of the plurality responds in one manner and another doll of the plurality responds in a second manner and third doll responds in a third manner, the first, second and third manners being different from one another.

4. A responsive book system according to claim 3, wherein each doll in the plurality of dolls is configured to respond to said current page in a different manner and wherein the different manners are selected from the group consisting of (i) singing contents of the current page, (ii) dancing contents of the current page and (iii) saying content of the current page.

5. A responsive book system according to claim 1, wherein said transmitter comprises a stereo-transmitter using a single standard stereo channel, such that for a given page each sub-channel thereof transmitting a different signal comprising a different response to each of said remote responders, wherein the storage is in the book and wherein the information about the current page received by the receiver of a first doll of the plurality of dolls comprises the content in the first signal to be presented by the first doll and wherein the information about the current page received by the receiver of a second doll in the plurality of dolls comprises the content in the second signal to be presented by the second doll.

6. A responsive book system according to claim 1, further comprising a recorder, for recording new content to be associated with said detectable pages.

7. A responsive book system according to claim 1, wherein said array of sensors of said detecting system is situated in a binding of the book.

8. A responsive book system according to claim 1, wherein for at least one furthest detectable page having a detectable mark in a particular distinctive zone associated with the page furthest from the array of sensors, one or more closer pages closer to the array of sensors has both a detectable mark at the distinctive zone associated with the page and an additional detectable mark at the particular distinctive zone, the additional detectable mark comprising a magnet and configured to improve detection by the array of sensors of the detectable mark in the at least one furthest detectable page.

9. A responsive book system according to claim 2, wherein a first doll of the plurality of dolls dances contents of a current page and a second doll of the plurality of dolls sings or says contents of the current page.

10. A responsive book system according to claim 1, wherein each of said magnetic sensors comprises a resonance circuit in said distinctive zone in at least one of a cover and a binding of said book, for detecting said current page.

11. A responsive book system according to claim 10, wherein said detecting system further comprises at least a second magnet located in said distinctive zone on at least one page between said first magnet and said resonance circuit, said second magnet for increasing the detectability of said first magnet.

12. A responsive book system according to claim 1, wherein each page of the plurality of detectable pages of the book having an electrically conductive mark situated in a distinctive zone on a cross-sectional area of said book, each distinctive zone associated with one of said plurality of detectable pages, the detecting system also including detectors for detecting the electrically conductive marks, wherein each of said electrically conductive marks comprises an electrical contact for closing and opening an electrical circuit between said electrical contacts of adjacent pages, upon leafing of each of said current pages.

13. A method for using a responsive book, said method comprising the steps of:

storing, in a storage, content associated with each of a plurality of detectable pages of a book, the content of the plurality of detectable pages combining together to form a combined story of the book;

the book using a detecting system to sense changes in a magnitude of an electromagnetic field when a current page of the book is turned by a user, the sensing of the change identifying a particular page of the book as the current page, wherein said detecting system includes (a) distinctive zones on the cross-sectional area of said book, each distinctive zone uniquely associated with one of said plurality of detectable pages, and includes a detectable mark on each of said plurality of pages, each of said detectable marks located in said distinctive zone thereof, for providing said association, each detectable mark including a first magnet and (b) an array of sensors at locations in one of (i) the binding or (ii) a book cover, uniquely associated with a current page for detecting the detectable marks and for sensing changes in a magnitude of an electromagnetic field as said current page is turned by a user, the magnitude of the electromagnetic field as said current page is turned being proportionate to a distance between (i) a sensor, of the array of sensors, uniquely associated with the current page and (ii) a magnet located in the distinctive zone uniquely associated with said current page, wherein for at least one furthest detectable page having a detectable mark in a particular distinctive zone associated with the page furthest from the array of sensors, one or more closer pages closer to the array of sensors has both a detectable mark at the distinctive zone associated with the lower numbered page and an additional detectable mark at the particular distinctive zone, the additional detectable mark comprising a magnet and configured to improve detection by the array of sensors of the detectable mark in the at least one furthest page, wherein each page of the plurality of detectable pages includes a top and bottom surface configured to present the contents of the book in words and/or pictures, each of the top and bottom surfaces having a surface area, wherein the detectable marks are invisible to a user of the book as a result of being embedded within a material of each page of the plurality of detectable pages, and wherein the detecting system and detectable marks are invisibly embedded within the material of the plurality of detectable pages and at least one of the cover page and binding, such that incorporation of the detecting system and detectable marks into the book does not interrupt the surface area of any page of the plurality of detectable pages and does not extend the surface area of any page of the plurality outward away from the binding, wherein the detectable pages are shaped as rectangular blocks and the distinctive zones on the cross-sectional area of said book are hidden within the rectangular blocks and spaced apart from any edge of the rectangular blocks;

the book detecting the current page uniquely associated with the distinctive zone by using sensed changes in magnitude of the electromagnetic field as the current page of the book is turned by a user to identify a particular page of the book as the current page;

transmitting, by using a transmitter in the book, a plurality of signals from said book to each doll in a plurality of dolls, each doll having a receiver configured to receive separate and independent signals of the plurality of signals, the plurality of signals configured to provide information to each doll about said current page including a first signal to the first doll concerning said current page and including a separate and independent second signal to the second doll concerning said current page;

each doll receiving said separate first or second signal of the plurality of signals and responding to said signal by playing content associated with said current page, each doll playing the content associated with said current page in a different manner, wherein the method using a single source of content from the storage to simultaneously provide a plurality of separate and independent signals of the plurality of signals respectively to the plurality of dolls such that a content played by first doll is not determined from a content played by the second doll or from an identity of the second doll.

14. The method of claim 13, further comprising locating the storage in the dolls such that a first doll in the plurality of dolls stores content to be presented by the first doll and a second doll in the plurality of dolls stores content to be presented by the second doll, and further comprising including in each doll of the plurality of dolls, a processing unit with access to the storage, the processing unit configured to select content from the storage.

15. A method according to claim 13, wherein said transmitting is carried out by a stereo-transmitter using a single standard stereo channel, such that for a given page each sub-channel of the stereo channel transmits a different signal comprising a different response to each doll of the plurality of dolls.

16. A method according to claim 13, further comprising the step of recording a new content to be associated with a page.

17. A method according to claim 13, wherein said detecting step comprises influencing a resonance circuit by a magnet located on a page.

18. A method according to claim 17, wherein said detecting step comprises closing or opening an electric circuit upon leafing using electric contacts on said pages.

19. A method according to claim 13, wherein said playing comprises a doll of the plurality of dolls responding to the current page by reading said current page and a doll from the plurality of dolls responding by moving consistent with a content of said page.

20. The method according to claim 14, further comprising having each doll in the plurality of dolls respond to said current page in different manners selected from the group consisting of (i) singing contents of the current page, (ii) dancing contents of the current page and (iii) saying content of the current page.

21. The method of claim 20, further comprising watching different dolls of the plurality of dolls respond differently to leafed pages of the book.

22. The method of claim 13, further comprising positioning the magnetic sensors in at least one of a binding of the book, a front cover of the book and a back cover of the book.

23. A responsive book system according to claim 1, wherein the detectable pages are shaped as rectangular blocks and the distinctive zones on the cross-sectional area of said book are hidden within the rectangular blocks and spaced apart from any edge of the rectangular blocks such that the detectable marks are invisible to a user of the book as a result of being embedded within a material of each page of the plurality of detectable pages.

24. A responsive book system comprising:
a book comprising a binding and a plurality of detectable pages and a detecting system for detecting a current page from the plurality of detectable pages of said book, said detecting system including distinctive zones on the cross-sectional area of said book, each distinctive zone uniquely associated with one of said plurality of detectable pages, and including a detectable mark on each of said plurality of pages, each of said detectable marks located in said distinctive zone thereof, for providing said association, each detectable mark including a first magnet;
a storage, for storing content associated with each of said detectable pages, the content of the plurality of detectable pages combining together to form a combined story of the book;
a plurality of remote responders, for playing the content associated with said current page, wherein each of said remote responders comprises a doll having a receiver embedded therein and having a processing unit with access to the storage and configured to select content from the storage pertaining to the doll, the content including audio associated with the current page and movement, if any, of the plurality of dolls accompanying the audio; and
the detecting system in the book also having an array of sensors at locations in one of (i) the binding or (ii) a book cover, uniquely associated with a current page for detecting the detectable marks and for sensing changes in a magnitude of an electromagnetic field as said current page is turned by a user, the magnitude of the electromagnetic field as the current page is turned being proportionate to a distance between (i) a sensor, of the array of sensors, uniquely associated with the current page and (ii) a first magnet located in the distinctive zone uniquely associated with said current page, so as to identify a particular page of the book as the current page, wherein each page of the plurality of detectable pages includes a top and bottom surface configured to present the contents of the book in words and/or pictures, each of the top and bottom surfaces having a surface area, wherein the detectable marks are embedded within the plurality of detectable pages, and wherein the detecting system is embedded within the plurality of detectable pages and at least one of the cover page and binding, such that incorporation of the detecting system into the book does not interrupt the surface area of any page of the plurality of detectable pages and does not extend the surface area of any page of the plurality outward away from the binding;

the book also having at least one transmitter configured to transmit to said plurality of dolls a plurality of signals providing information from the storage including a first signal to the first doll concerning said current page and including a separate and independent second signal to the second doll concerning said current page; and each of said one or more receivers configured to receive said separate first or second respective signal of the plurality of signals, the processing unit of each particular doll of the plurality of dolls for selecting the response of the particular doll to the current page, wherein the responsive book system is configured to allow a user to turn current pages of the book and thereby hear the plurality of dolls play contents of the current pages, by using a single source of content from the storage to simultaneously provide a plurality of separate and independent signals of the plurality of signals respectively to the plurality of dolls wherein a content played by the first doll is not determined from a content played by the second doll or from an identity of the second doll.

\* \* \* \* \*